Nov. 10, 1970 R. A. BRANDT 3,539,995

MATRIX FOR THE COORDINATE DETECTION OF POINT SOURCE RADIATION IN A TWO-DIMENSIONAL PLANE

Filed Feb. 12, 1968

Raymond A. Brandt,
INVENTOR.

BY Harry H. Sosgovitz
Edward J. Kelly
Herbert Berl
Robert C. Sims

United States Patent Office 3,539,995
Patented Nov. 10, 1970

3,539,995

MATRIX FOR THE COORDINATE DETECTION OF POINT SOURCE RADIATION IN A TWO-DIMENSIONAL PLANE

Raymond A. Brandt, 3215 Teton Drive NW., Huntsville, Ala. 35810

Filed Feb. 12, 1968, Ser. No. 704,667
Int. Cl. H04q 9/00
U.S. Cl. 340—166 10 Claims

ABSTRACT OF THE DISCLOSURE

The matrix will provide an output indicative of the interception of an $x$, $y$, coordinate by a point source of light. The matrix is composed of a plurality of light activated silicon controlled rectifiers fed by a sustaining power supply such that once a rectifier is conducting, it will remain conducting until reset by a switch which disconnects the power supply. A stepping circuit directs, in steps, voltage along the $x$ axis until a full output is obtained on the $y$ axis, and at this point the stepping circuit is stopped and the desired output can be read out.

DEDICATORY CLAUSE

The invention described herein may be manufactured, used, and licensed by or for the Government for governmental purposes without the payment to me of any royalty thereon.

BACKGROUND OF THE INVENTION

This invention is directed towards improvements in the field of coordinate detection. The point to be read is beamed by a light source to the matrix. In the prior art the problem of retention of the information, after the beam moved on to another position or was cut off, has involved very complex circuitry. Therefore, a simple matrix system having a memory function such as taught by the present invention has been desired for sometime in this field of endeavor. A further advantage of the present invention over the prior art devices is that the point can be read at any desired time.

SUMMARY OF THE INVENTION

A matrix of light activated silicon controlled rectifiers (LASCR) is provided to act as sensing and memory means. Each rectifier is individually connected to a power source through individual resistors. Therefore, when a beam of light strikes one of the rectifiers, the rectifier goes to its conducting state and will be maintained in that state by the power source. The cathodes of the rectifiers are connected to form the $y$ axis of the matrix; while the anodes of the rectifiers are connected to form the $x$ axis of the matrix. The outputs of the $y$ axis are binary encoded through diodes. The $x$ axis of the matrix is activated with full power in steps by means of a counter and amplifiers. When the count causes the proper voltage to be applied to a rectifier which is in its conducting state, then full power will be applied to the desired position on the $y$ axis. This output is fed through an intercept detector circuit which will cause the counter to stop counting at this point. Now the coordinates of the intercept of the beam of light can be found by reading the encoded output of the $y$ axis and the count of the counter. A photovoltaic cell may be provided to correct the sensitivity of the rectifiers. This cell will sense the background level of radiation and by way of an amplifier and resistors it will supply the triggers of the rectifiers with the proper bias so that random background radiation levels do not erroneously trigger any of the rectifiers.

DESCRIPTION OF THE PREFERRED EMBODIMENT

Figures 1, 2, 3:
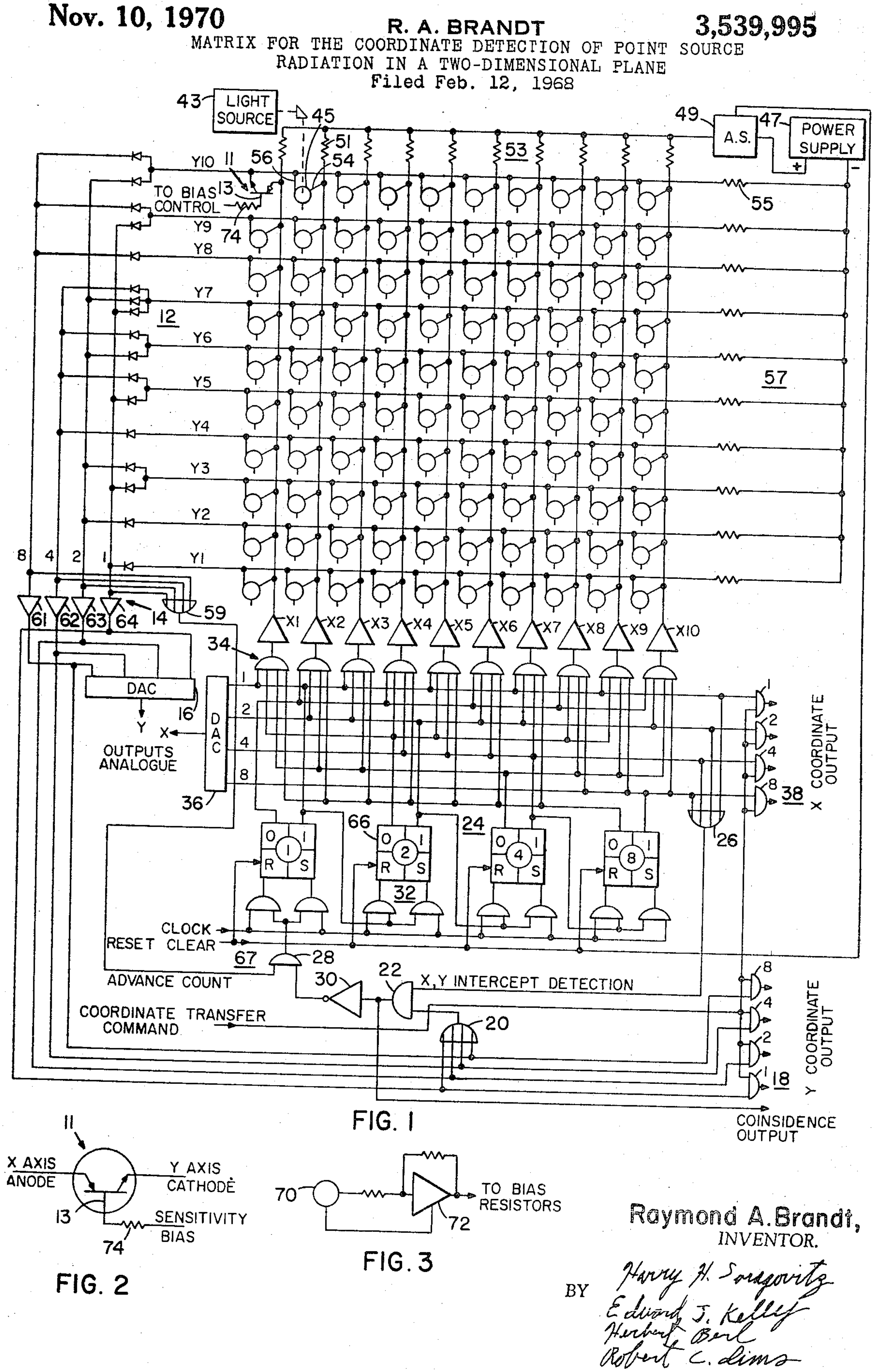
FIG. 1 shows a schematic diagram illustrating a preferred form of the present invention.
FIG. 2 illustrates a typical light activated silicon controlled rectifier.
FIG. 3 is a schematic diagram illustrating a circuit which will provide a signal to adjust the sensitivity of the rectifiers of FIG. 1.

In FIG. 1, the elements of matrix are illustrated by circles having three terminals. The circles each stand for a switching element such as LASCR 11 shown in FIG. 2, and each has first and second terminals connected in the same manner as LASCR 11 shown in the upper left-hand corner of the matrix. The cathodes of the LASCR's are connected to form the $y$ axis Y1–Y10 of the matrix. The anodes are connected to form the $x$ axis of the matrix. The bias or trigger 13 of the LASCR's is connected to a sensitivity bias resistor. Although a 10 x 10 matrix is shown, it is expandable in both the $x$ and $y$ directions to any number of points desirable.

The outputs of the $y$ axis Y1–Y10 is binary encoded by diodes 12 which connect the outputs through the 8–4–2–1 bus bars to amplifiers 14. Diodes 12 perform the function of routing voltages to selected bus bars. Amplifiers 14 are of high impedance or threshold type such that they will have outputs only when substantial inputs are presented. The outputs of the amplifiers are connected to a digital-to-analog converter 16. The output of converter 16 represents the analog $y$ coordinate. The outputs of amplifiers 14 are also fed to coordinate output AND gates 18 where, upon a coordinate transfer command from a unit not shown, the digital $y$ coordinate will be obtained from the outputs of gates 18.

The outputs of amplifiers 14 are also fed through OR gate 20 to one input of AND gate 22. The other input of AND gate 22 is connected to the outputs of counters 24 by way of OR gate 26 and performs the function of a fail safe circuit in case the counter is not indicating a proper count (such as 0). The output of AND gate 22 is tapped to indicate a coincidence between the $x$ and $y$ axis and is also fed to the advance inhibit AND gate 28 by way of inverter 30. If there is any output of amplifiers 14, then gate 28 will not have an output; therefore stopping any further advance of counter 24.

Counter 24 is fed by a clock, not shown. Counter 24 is made up of four J–K flip-flops which have a pre-reset input. The pulses from the clock are connected to the counter by way of AND gates 32. If there is no output from gate 28, then the pulses from the clock cannot advance the count of counter 24. The output of the counter is connected to counter translation AND gates 34 and to a digital-to-analog converter 36. Converter 36 will have an output which represents the analog value of the count of the counter. The output of the counter is also connected to coordinate output AND gates 38 where upon a coordinate transfer command the digital $x$ coordinate will be obtained from the outputs of gates 38. Emitter follower amplifiers X1–X10 are connected to the outputs of gates 34. As can easily be seen in FIG. 1, the connections of the counter translation decode the binary output of the counter and sequentially activate the emitter follower amplifiers. Amplifiers X1–X10 in turn put a voltage (in steps) on each $x$ axis of the matrix.

A light source 43 provides a point of light of sufficient radiance to trigger a LASCR into its conducting or "ON" state. Light source 43 may be any of the known curve following or selective position devices. Source 43 may be a servo-operated carriage system which positions a light and lens over a desired place on the matrix.

When the light source intercepts one of the junctions of the LASCR's, for example LASCR 45, then LASCR 45 becomes conductive. Current will now flow from the sustaining power supply 47 through analog switch 49, resistor 51 of the X resistors, 53, first connection side 54, anode and cathode of LASCR 45, second connection side 56, and resistor 55 of the Y resistors 57 back to the other side of supply 47. Due to this flow of current the activated LASCR will remain in the conductive state even after the light source moves on or is cut off. The ratio of the resistors 53 to the resistors 57 is 10 to 1. From this, it can be seen that the voltage applied to the $y$ axis is less than $\frac{1}{10}$ of the power supply voltage. None of the high impedance amplifiers 14 will have an output with this reduced voltage. However, an OR gate 59 having a gain of 10 is also connected to the bus bars, and it will have an output in response to this reduced voltage. The output of OR gate 59 is fed to advance inhibit gate 28, which will now have an output so as to allow the counter to advance its count. It should be noted that OR gate 59 could be replaced by an outside command line which would order the counter to advance for reasons of its own. On the first count, amplifier X1 will be activated; however, since no LASCR in the $x1$ portion of the matrix is activated, there will be no voltage fed to the $y$ axis. On the second count, amplifier X2 is activated, and there will be voltage applied to the Y10 axis by way of the activated LASCR 45. Bus bars 8–2 will now supply voltage to the amplifiers 61 and 63 which will in turn have outputs. Amplifiers 62 and 64, of course, will not have outputs. The outputs of amplifiers 61 and 63 will cause OR gate 20 to have an output. This output along with the output of OR gate 26 (caused by the "1" output of J–K flip-flop 66) will cause AND gate 22 to have an output indicating a coincidence. This output is inverted by inverter 30 which will now present a "0" in put to AND gate 28; therefore preventing any further advance of counter 24.

It can now be seen that the circuit will remain in this condition until it is reset by a signal on the reset clear line 67. The analog outputs can be read from converters 16 and 36, and the digital outputs can be read from gates 18 and 38. When the reset clear line is pulsed by an outside source, not shown, all the J–K flip-flops will return to their "0" states and analog switch 49 will be pulsed open and then will close. While switch 49 was open, the sustaining power to LASCR 45 was interrupted; therefore LASCR 45 and any other LASCR which was in a conducting state will revert back to its nonconducting state. The matrix is now ready for another reading.

FIG. 3 shows an automatic sensitivity adjustment circuit which could be used in the present invention to compensate for changing background radiation levels. A photovoltaic cell 70 is positioned so that it will sense the background radiation level at the matrix. The output of cell 70 proceeds through amplifier 72 to the sensitivity bias resistor (74 in FIGS. 1 and 2) of each of the LASCR's of the matrix to prevent erroneous triggering of the LASCR's by background radiation.

While the invention has been described with reference to a preferred embodiment thereof, it will be apparent that various modifications and other embodiments thereof will occur to those skilled in the art within the scope of the invention. Accordingly, it is desired that the scope of the invention be limited only by the appended claims.

What is claimed is:

1. A system comprising:

a matrix of control switching elements each having first and second terminals, conducting-nonconducting state capabilities and including said first terminals of the switching elements being connected together in groups to form the $y$ axis of the matrix, said second terminals of the switching elements being connected together in groups to form the $x$ axis of the matrix.

a voltage source, connecting means between said source and said switching elements whereby any switching element in its conducting state will be maintained in that state by said source and will provide a path from the power supply means to the $y$ axis.

a plurality of amplifiers having voltage outputs connected to the $x$ axis, stepping means connected to the plurality of amplifiers so as to sequentially activate said amplifiers, circuit means being connected to the $y$ axis, and said circuit means being unresponsive to the voltage from said voltage source and responsive to the voltage from said amplifiers, wherein said switching elements are light activated silicon controlled rectifiers, and the matrix is in a two-dimensional plane such that the coordinates can be obtained from said circuit means and said stepping means.

2. A system as set forth in claim 1, further comprising a switch means connected between said first power supply means and said switching elements whereby said first power supply means can be disconnected from said switching elements and allow them to all go to their nonconducting state.

3. A system as set forth in claim 1, further comprising a gating circuit which is responsive to the power level of said first power supply means, said gating circuit being connected to said $y$ axis of the matrix and to said stepping means so as to cause activation of said stepping means when a switching means is in its conducting state.

4. A system as set forth in claim 1, further comprising a gating circuit connected to an output of said circuit means, and said gating circuit being connected to said stepping means so as to stop further advancement of the stepping means upon said circuit means responding to the power level of said second power supply means.

5. A system as set forth in claim 4, further comprising a switch means connected between said first power supply means and said switching elements whereby said first power supply means can be disconnected from said switching elements and allow them to all go to their nonconducting state.

6. A system as set forth in claim 5, further comprising first and second groups of impedances, said first group of impedances being individually connected between the $y$ axis of the matrix and one side of the first power supply means, and said second group of impedances being connected between said switch means and the $x$ axis of the matrix.

7. A system as set forth in claim 1, wherein said circuit means comprises a plurality of bus bars, a plurality of diodes connected to the $y$ axis of the matrix and the bus bars so as to binary encode the output of the $y$ axis, and said bus bars being connected to a plurality of high impedance amplifier devices.

8. A system as set forth in claim 7, further comprising an OR gate having inputs connected to said bus bars, said OR gate being responsive to the voltage said voltage source presents to the bus bars upon the occurrence of one of the control rectifiers going to its conducting state, and an output of the OR gate being connected to said gating circuit so as to cause advancement of the stepping means.

9. A system as set forth in claim 8, further comprising an activating means which is positioned with respect to the matrix so as to cause one of the control switching elements to go into its conducting state.

10. A system as set forth in claim 9, wherein said activating means is a light activating means, and further comprising a photosensitive element located in the area of the matrix to sense background radiation, responsive means connected to and responsive to said photosensitive element, said rectifiers each having a bias element, and sensitivity bias resistor means connected between said bias elements and said responsive means so as to bias said rectifiers with respect to the background radiation.

References Cited

UNITED STATES PATENTS

| | | | |
|---|---|---|---|
| 3,342,935 | 9/1967 | Leifer et al. | 340—146.3 |
| 3,399,401 | 8/1968 | Ellis et al. | 340—166 XR |
| 3,011,155 | 11/1961 | Dunlap | 340—166 XR |

DONALD J. YUSKO, Primary Examiner

U.S. Cl. X.R.

178—19; 340—324